(12) United States Patent
How et al.

(10) Patent No.: US 12,080,913 B2
(45) Date of Patent: *Sep. 3, 2024

(54) WIRING HARNESS FOR ENERGY STORAGE SYSTEM

(71) Applicant: Lunar Energy, Inc., Mountain View, CA (US)

(72) Inventors: Peter H. J. How, Mililani, HI (US); Tanner Bruce DeVoe, Fremont, CA (US); Mark Holveck, Sunnyvale, CA (US); Anthony Sagneri, Dayton, NV (US); Christopher Breckenridge Todd, Jackson, WY (US); Randol Aikin, Piedmont, CA (US); Mark Daniel Goldman, Los Altos Hills, CA (US); Conrad Xavier Murphy, Piedmont, CA (US); Kevin Richard Fine, Redwood City, CA (US); Brian M. Neil, Piedmont, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,358

(22) Filed: May 8, 2023

(65) Prior Publication Data

US 2024/0128594 A1 Apr. 18, 2024

Related U.S. Application Data

(63) Continuation of application No. 17/964,474, filed on Oct. 12, 2022, now Pat. No. 11,769,935.

(51) Int. Cl.
*H01M 50/502* (2021.01)
*H01B 7/00* (2006.01)

(52) U.S. Cl.
CPC ........ *H01M 50/502* (2021.01); *H01B 7/0045* (2013.01); *H01M 2220/10* (2013.01)

(58) Field of Classification Search
None
See application file for complete search history.

(56) References Cited

U.S. PATENT DOCUMENTS

| | | | | |
|---|---|---|---|---|
| 4,286,235 A | * | 8/1981 | Wilber | H03C 3/42 331/116 R |
| 4,286,290 A | * | 8/1981 | Pyles | G11B 27/36 386/E5.028 |

(Continued)

FOREIGN PATENT DOCUMENTS

| | | |
|---|---|---|
| CA | 2958452 | 1/2018 |
| CN | 101989670 | 3/2011 |

(Continued)

OTHER PUBLICATIONS

KR-20210093170-A_translation. 2021-07-27 (Year: 2021).*

(Continued)

*Primary Examiner* — Timothy J. Dole
*Assistant Examiner* — Muhammed Azam
(74) *Attorney, Agent, or Firm* — Van Pelt, Yi & James LLP

(57) ABSTRACT

A wiring harness for a battery and inverter system includes a main cable. It further includes an inverter connector configured to plug the main cable into an inverter module. It further includes a first spur of the main cable terminating in a first-type battery device connector. It further includes a second spur of the main cable terminating in a second type battery device connector.

10 Claims, 7 Drawing Sheets

(56) References Cited

U.S. PATENT DOCUMENTS

| | | | |
|---|---|---|---|
| 9,559,473 B2* | 1/2017 | Boudreaux | H01R 11/288 |
| 9,893,385 B1 | 2/2018 | Nayar | |
| 10,181,800 B1 | 1/2019 | Nayar | |
| 10,220,724 B2* | 3/2019 | Kim | H01M 8/04302 |
| 10,378,742 B1 | 8/2019 | Rao | |
| 10,522,266 B2* | 12/2019 | Kuboshima | H01B 7/00 |
| 10,717,366 B1* | 7/2020 | Jaksic | H02M 7/5387 |
| 11,671,031 B1* | 6/2023 | Holveck | H02J 3/381 |
| | | | 363/56.01 |
| 11,769,935 B1* | 9/2023 | How | H01M 10/425 |
| | | | 174/72 A |
| 11,973,205 B2* | 4/2024 | Yang | H01M 10/647 |
| 2005/0146825 A1* | 7/2005 | Kaszeta | H01M 50/583 |
| | | | 429/61 |
| 2008/0088276 A1 | 4/2008 | Hurst | |
| 2008/0090139 A1 | 4/2008 | Hurst | |
| 2009/0066290 A1 | 3/2009 | Altekruse | |
| 2010/0084205 A1 | 4/2010 | Tarchinski | |
| 2011/0135970 A1* | 6/2011 | Han | H01M 50/502 |
| | | | 429/7 |
| 2012/0181973 A1 | 7/2012 | Lyden | |
| 2013/0043826 A1 | 2/2013 | Workman | |
| 2013/0065087 A1 | 3/2013 | Kim | |
| 2013/0183562 A1 | 7/2013 | Workman | |
| 2014/0163726 A1 | 6/2014 | Shoenfeld | |
| 2014/0342212 A1 | 11/2014 | Goesmann | |
| 2015/0263668 A1 | 9/2015 | Sader | |
| 2015/0347342 A1* | 12/2015 | Alley | G06F 13/4068 |
| | | | 710/306 |
| 2016/0137098 A1 | 5/2016 | Katano | |
| 2016/0172653 A1 | 6/2016 | Henderson | |
| 2016/0366795 A1* | 12/2016 | Ohkubo | H05K 9/0098 |
| 2016/0380248 A1* | 12/2016 | Haer | B04C 3/06 |
| | | | 55/327 |
| 2017/0077558 A1 | 3/2017 | Nystrom | |
| 2017/0077559 A1 | 3/2017 | Beaston | |
| 2017/0174152 A1* | 6/2017 | Yamaguchi | H01B 7/426 |
| 2017/0237379 A1 | 8/2017 | Fukazu | |
| 2018/0183224 A1* | 6/2018 | Hiromori | H01B 7/0045 |
| 2018/0374635 A1* | 12/2018 | Iizuka | H01B 7/0045 |
| 2019/0123318 A1 | 4/2019 | Fees | |
| 2019/0296400 A1 | 9/2019 | Sekiguchi | |
| 2019/0379015 A1* | 12/2019 | Ochi | H01M 50/505 |
| 2020/0076208 A1* | 3/2020 | Williams | H02J 7/34 |
| 2020/0152950 A1 | 5/2020 | Rodriguez | |
| 2020/0211736 A1 | 7/2020 | Hayashi | |
| 2020/0274379 A1 | 8/2020 | Schurink | |
| 2020/0295403 A1 | 9/2020 | Hotta | |
| 2020/0312485 A1* | 10/2020 | Yamashita | H01B 7/0275 |
| 2020/0381923 A1 | 12/2020 | Chow | |
| 2021/0036296 A1* | 2/2021 | Nobuhira | H01M 50/209 |
| 2021/0094485 A1* | 4/2021 | Fuchigami | B60R 16/0215 |
| 2021/0119193 A1* | 4/2021 | Eftekhari | H01M 50/227 |
| 2021/0126314 A1* | 4/2021 | Masuda | H01M 50/298 |
| 2021/0151812 A1* | 5/2021 | Ye | H01M 50/209 |
| 2021/0226187 A1 | 7/2021 | Karr | |
| 2021/0343993 A1* | 11/2021 | Yang | H02J 7/0013 |
| 2022/0123403 A1* | 4/2022 | Lee | H01M 10/425 |
| 2022/0140409 A1* | 5/2022 | Palatov | H01M 50/249 |
| | | | 429/52 |
| 2022/0294055 A1 | 9/2022 | Kittell | |
| 2022/0311257 A1 | 9/2022 | Lai | |
| 2023/0083678 A1* | 3/2023 | Goldman | H01M 10/647 |
| | | | 429/56 |
| 2023/0143369 A1* | 5/2023 | Yano | H01M 50/284 |
| | | | 180/68.5 |
| 2023/0150397 A1* | 5/2023 | Asakura | B60L 58/26 |
| | | | 180/65.29 |
| 2023/0163492 A1* | 5/2023 | Kobayashi | H01R 4/18 |
| | | | 439/877 |
| 2024/0106050 A1* | 3/2024 | McCarthy | H01M 50/244 |

FOREIGN PATENT DOCUMENTS

| | | | |
|---|---|---|---|
| CN | 102826019 | 12/2012 | |
| CN | 103081214 A * | 5/2013 | B60L 11/1879 |
| CN | 105006542 A * | 10/2015 | |
| CN | 107017378 A * | 8/2017 | |
| CN | 107706450 | 2/2018 | |
| CN | 108352537 | 7/2018 | |
| CN | 108638818 | 10/2018 | |
| CN | 108767162 | 11/2018 | |
| CN | 110268552 | 9/2019 | |
| CN | 112428874 | 3/2021 | |
| CN | 212808546 | 3/2021 | |
| CN | 112640178 | 4/2021 | |
| CN | 113904065 | 1/2022 | |
| DE | 102012013929 A1 * | 1/2014 | B66C 15/06 |
| DE | 102015218226 | 3/2016 | |
| DE | 102016203923 | 9/2017 | |
| DE | 102019134469 A1 * | 7/2020 | H01M 10/486 |
| DE | 102021104047 | 3/2022 | |
| EP | 2645466 | 10/2013 | |
| EP | 3528313 | 8/2019 | |
| EP | 3528314 | 8/2019 | |
| EP | 3598530 A1 * | 1/2020 | |
| EP | 2823991 | 7/2020 | |
| EP | 4050629 A1 * | 8/2022 | H01G 11/08 |
| EP | 4068468 A1 * | 10/2022 | B60L 58/26 |
| FR | 2903060 | 1/2008 | |
| GB | 2190522 A * | 11/1987 | G06F 7/5525 |
| JP | 2014203754 | 10/2014 | |
| KR | 20120051808 A * | 5/2012 | |
| KR | 20130124641 A * | 11/2013 | |
| KR | 20130132902 | 12/2013 | |
| KR | 20140059901 | 5/2014 | |
| KR | 20140059909 | 5/2014 | |
| KR | 20140107917 A * | 9/2014 | |
| KR | 20160002070 U * | 6/2016 | |
| KR | 20160089708 | 7/2016 | |
| KR | 20170073331 A * | 6/2017 | |
| KR | 101829350 B1 * | 2/2018 | |
| KR | 102117646 | 6/2020 | |
| KR | 102199151 | 1/2021 | |
| WO | 2009154599 | 12/2009 | |
| WO | 2012040369 | 3/2012 | |
| WO | WO-2012026272 A1 * | 3/2012 | B60R 16/0215 |
| WO | 2012158185 | 11/2012 | |
| WO | 2013029749 | 3/2013 | |
| WO | WO-2014198900 A1 * | 12/2014 | H01M 10/0445 |
| WO | WO-2015026103 A1 * | 2/2015 | H01M 10/0525 |
| WO | WO-2015072335 A1 * | 5/2015 | H01B 7/0045 |
| WO | WO-2016149322 A1 * | 9/2016 | H02M 1/00 |
| WO | WO-2018139310 A1 * | 8/2018 | H01B 7/0045 |
| WO | 2019023672 | 1/2019 | |
| WO | WO-2020138847 A1 * | 7/2020 | H01M 10/425 |
| WO | 2021029894 | 2/2021 | |
| WO | 2021034423 | 2/2021 | |
| WO | 2021074572 | 4/2021 | |
| WO | WO-2021177295 A1 * | 9/2021 | B60R 16/0215 |
| WO | WO-2022044733 A1 * | 3/2022 | B60R 16/0215 |
| WO | 2022138311 | 6/2022 | |

OTHER PUBLICATIONS

Arduino, "How to daisy chain dissimilar backup batteries together." https://forum.arduino.cc/t/how-to-daisy-chain-dissimilar-backup-batteries-together/121783 (Year: 2012).

Daisy Chain Cable. Amazon .https://www.amazon.com/PowerFilm-HD-Daisy-Chain-Accessory/dp/B076DGH68X (Year: 2017).

Emori (Hitachi). "Battery control circuit using non-isolation daisy-chain architecture for a 400V Li-ion battery system." IEEE VPPC. Sep. 2008 (Year: 2008).

* cited by examiner

12,080,913 B2

WIRING HARNESS FOR ENERGY STORAGE SYSTEM

CROSS REFERENCE TO OTHER APPLICATIONS

This application is a continuation of U.S. patent application Ser. No. 17/964,474, entitled WIRING HARNESS FOR ENERGY STORAGE SYSTEM filed Oct. 12, 2022 which is incorporated herein by reference for all purposes.

BACKGROUND OF THE INVENTION

Installing components of an energy storage system at a site can be challenging. For example, in installing existing systems, wiring together components includes stripping wires, terminating the wires with connectors, etc., which can be time consuming.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of a wiring harness for an energy storage system. As will be described in further detail below, the wiring harness described herein allows for a modular energy storage system, in which modular battery block components are able to be connected, via the wiring harness, to an inverter.

Figure 1:
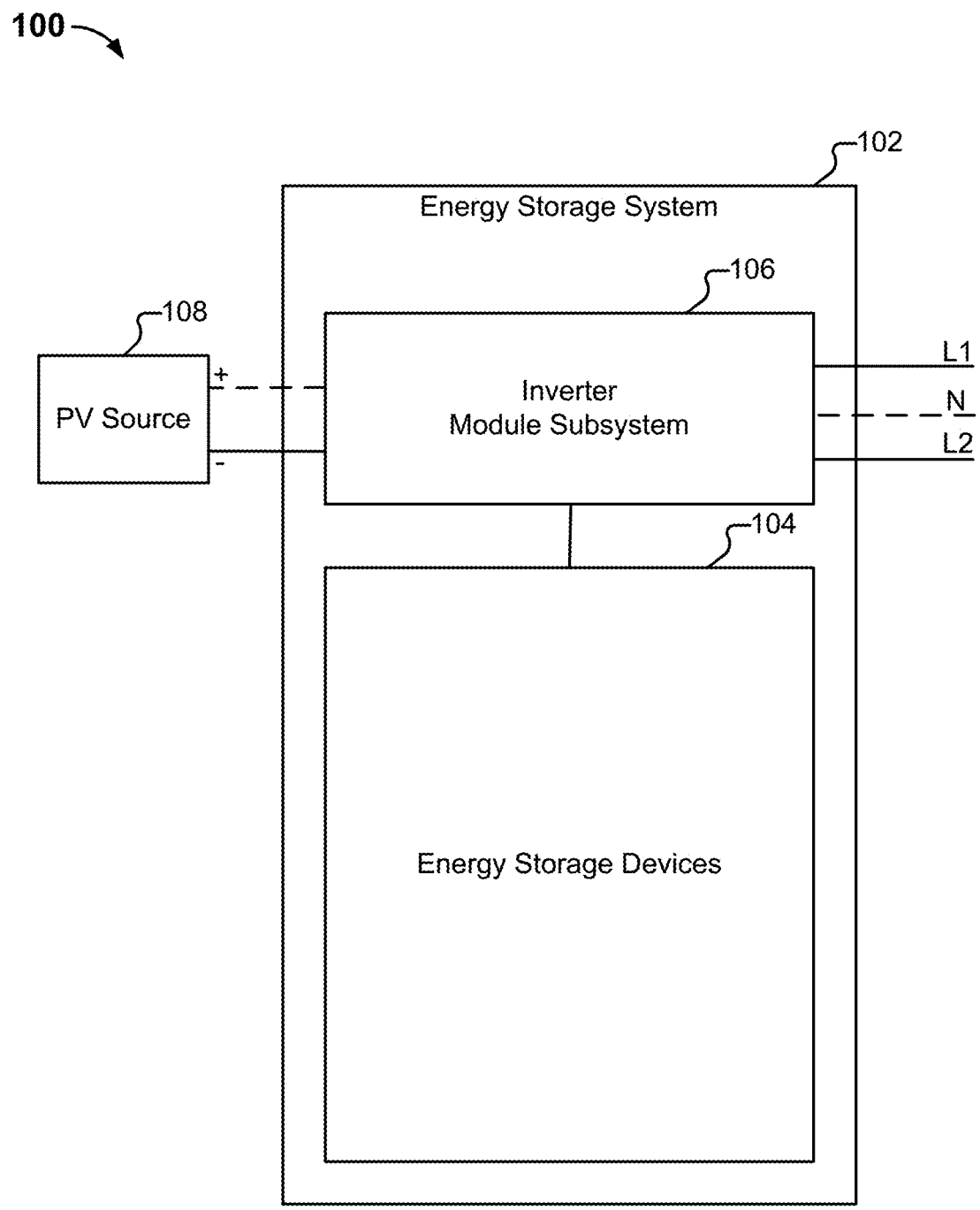
FIG. 1 illustrates an embodiment of a site energy system.

FIG. 1 illustrates an embodiment of a site energy system. As shown in this example, energy system 100 includes energy storage system (ESS) 102. The ESS includes energy storage devices (e.g., batteries) 104 and an inverter subsystem 106. The energy system also includes a photovoltaic (PV) source 108, such as an array of solar panels.

In this example, the inverter has a bi-directional power connection from the energy storage devices, as well as a connection to receive input power from the solar panels. The inverter is a power converter that is configured to invert DC (Direct Current) power from the PV array and battery blocks to AC (Alternating Current) power. The AC output of the inverter (L1, N, L2) is connected, for example, to the main breaker panel in a site such as a home or other building. The AC power outputted by the inverter may then be used to power loads at the site. The inverter may also be connected to the grid. In some embodiments, the inverter is configured to convert between power from the batteries, power from the PV array, and power from the grid, as well as trade power between the sources as needed.

Figure 2:
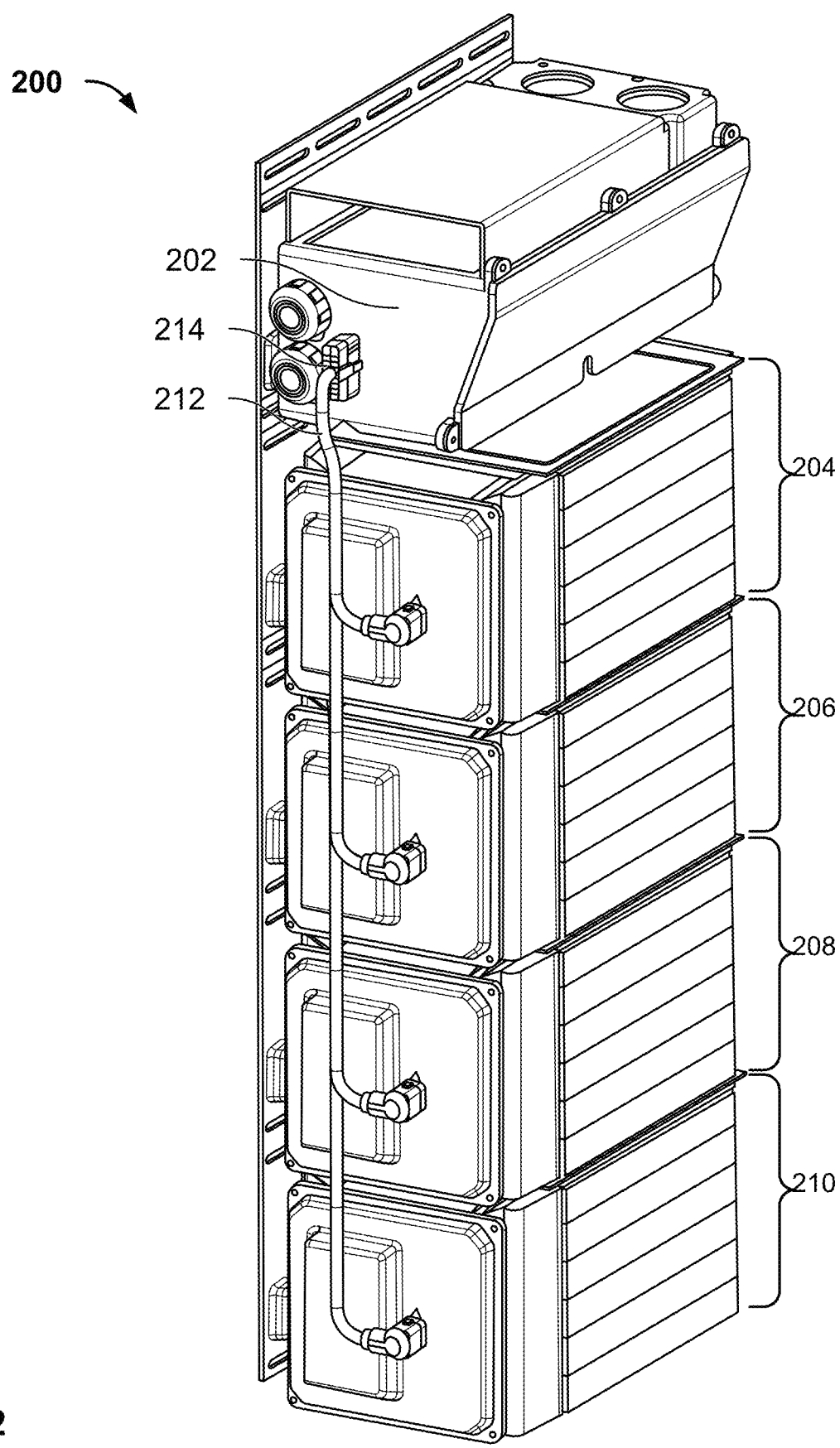
FIG. 2 illustrates an embodiment of an energy storage system.

FIG. 2 illustrates an embodiment of an energy storage system. In some embodiments, ESS 200 is an example of ESS 102 of FIG. 1. In this example, energy storage system 200 includes an inverter 202 (which in some embodiments is an example of inverter subsystem 106 of FIG. 1) and a stack of battery blocks 204, 206, 208, and 210 (which, as one example, make up the energy storage devices 104 of FIG. 1). While an example including four battery blocks is shown in this example for illustrative purposes, the energy storage system is modular and scalable, and can have any number or configuration of battery blocks, as appropriate. For example, the energy storage system may be configured to have between one and six battery blocks. In some embodiments, and as will be described in further detail below, each battery block or device includes a set of battery modules, as well as a DC-DC power converter.

A wiring harness is shown at 212. In this example, the wiring harness has five connectors on it: one for each of the four battery blocks, and one connector that plugs into the inverter 202 via inverter connector 214 of the wiring harness. Further details regarding the wiring harness are described below.

Figure 3A:
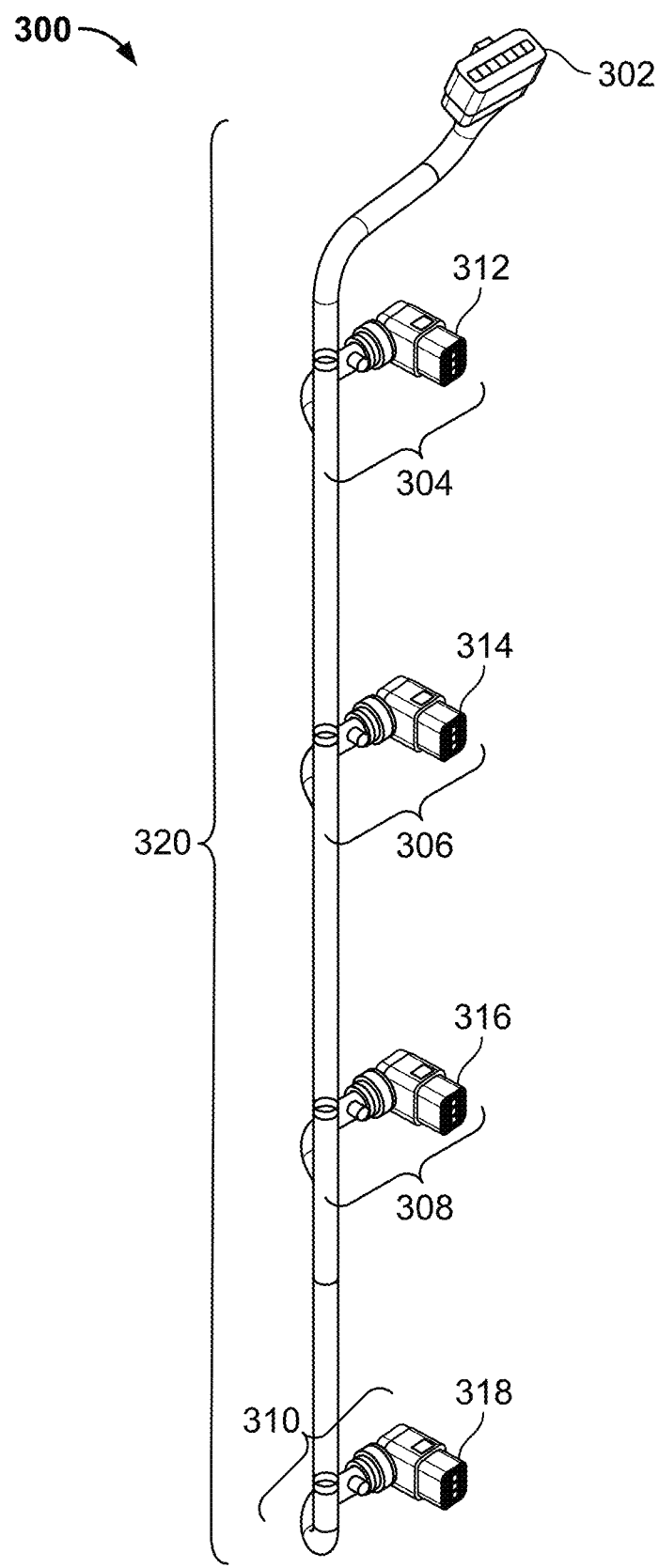
FIG. 3A illustrates an embodiment of a wiring harness.
Figure 3B:
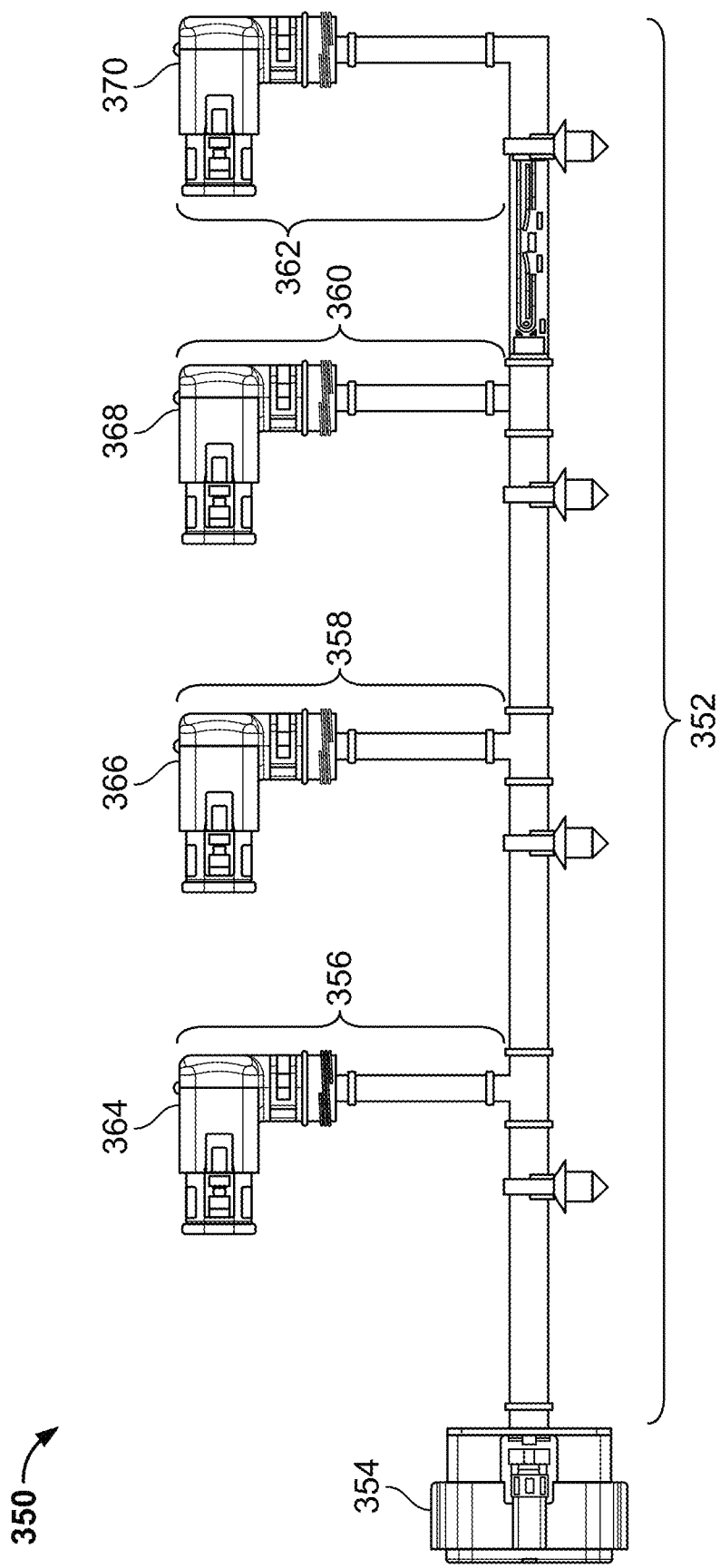
FIG. 3B illustrates an embodiment of a wiring harness.

FIGS. 3A and 3B illustrate embodiments of wiring harnesses. The wiring harnesses shown in the examples of FIGS. 3A and 3B are examples of wiring harness 212. As shown in the example of FIG. 3A, one end of the wiring harness 300 includes an inverter connector 302 to connect to an inverter module (e.g., inverter subsystem 202 or 106). In this example, the wiring harness has a main trunk 320. Off of the trunk are spurs 304, 306, 308, and 310. On each end of the spurs of the wiring harness, there is a respective or corresponding battery connector (e.g., connectors 312, 314, 316, and 318) for plugging into corresponding connectors on the battery blocks. This allows for a flexible number of battery blocks in each energy storage system, while reusing the same inverter and the same battery block for various different installations.

FIG. 3B illustrates an alternate view of the wiring harness shown in FIG. 3A. In the example wiring harness 350 of FIG. 3B, at one end of the main trunk 352 is inverter connector 354. Off of the main trunk are spurs 356, 358, 360, and 362. Each spur ends in a respective battery block connector (e.g., battery block connectors 364, 366, 368, and 370).

In the example wiring harness configuration shown, each spur mates one-to-one with a battery block. In some embodiments, there is a different wiring harness for energy storage systems with different numbers of battery blocks (e.g., a harness with 4 battery connectors as shown in this example, a different harness with 3 battery connectors for energy storage systems with 3 battery blocks, etc.). In other embodiments, the spurs are terminated with a jumper cable, where different number of spurs can be attached to a trunk harness. In this way, a single trunk harness may be used with energy storage systems with varying numbers of battery blocks.

Figure 4:
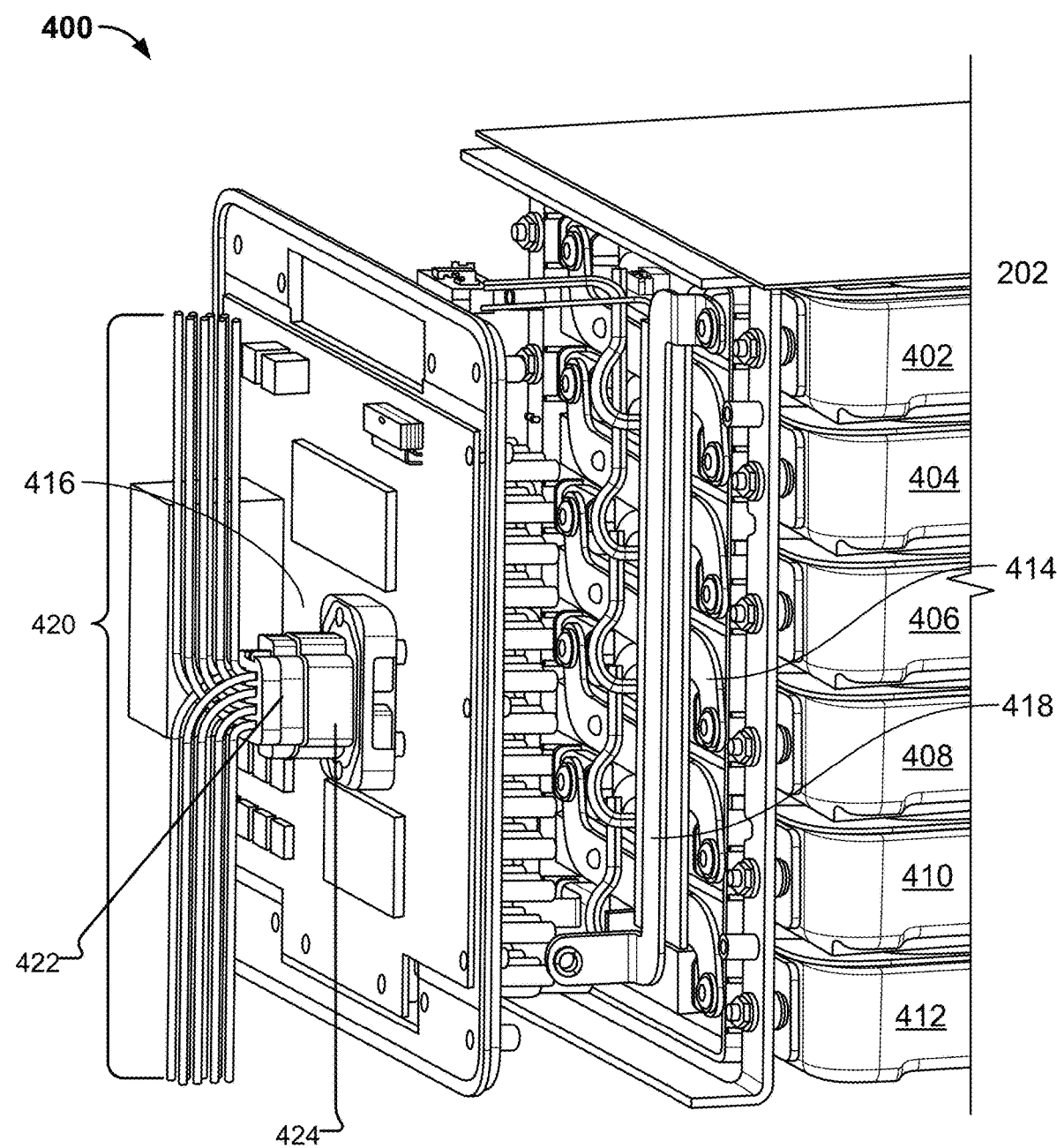
FIG. 4 illustrates an embodiment of a portion of a battery block.

FIG. 4 illustrates an embodiment of a portion of a battery block. In this example, a perspective view of a portion of a battery block 400 such as battery blocks 204-210 is shown. For example, the portion of the battery block with a block-side connector that a battery connector spur on the trunk harness plugs into is shown.

In some embodiments, each battery block includes a stack of battery modules. Battery modules may be connected in series and/or in parallel. In this example, the battery block includes six battery modules 402, 404, 408, 410, and 412, which are connected in series. For example, the battery modules are connected in series by using s-shaped busbars (module-to-module busbars) such as s-shaped busbar 414. Here, the busbar between one module to the next connects an anode of one module to the cathode of another module, or the cathode of one module to the anode of another module. The electrical series connection of the battery modules as shown in the example of FIG. 4 allows the addition of the voltages of the individual battery modules. As one example, each module operates at 8.4V. Here, the battery block includes six battery modules. This results in the stack of battery modules having a voltage of 50V (8.4V*6).

The following are embodiments of a battery module. As one example, the battery module includes four battery cells. The four battery cells in the module are grouped into two pairs of cells. The cells in each pair are connected in parallel, with a voltage output of 4.2V. The two pairs of cells are connected in series, such that the output voltage of two pairs of cells is doubled to 8.4V. That is, the output voltage of a battery module is 8.4V. The outputs of the 6 battery modules in a battery block are connected in series, such that there is 8.4V*6=50V (nominal or maximum) output from the battery block.

In some embodiments, the outputs of the series-connected stack of battery modules are fed into a DC-DC converter 416, where the DC-DC converter is between the internal battery modules and the output of the battery block. For example, an overall stack/block busbar 418 brings the top module back down to give the full stack voltage into the DC-DC converter 416. In this example, the DC-DC converter is configured to boost the stacked voltage of the battery modules up to, for example, 200V (nominally, for example ~180V). The output of the DC-DC converter is then connected (via a connector 424 on the battery block) to the inverter via the wiring harness (which, as described above, includes a spur that terminates in a battery block connector that mates with a corresponding connector on the battery-block side).

Shown in this example portion of the battery block is a portion of the wiring harness that includes a spur that, at its end, has a battery-block connector that plugs into a receptacle on the battery-block side that allows a connection to the battery block. Embodiments of the pin/wiring of the battery-block side connector are described in further detail below. In this example, a portion of a main trunk of the wiring harness is shown at 420. A connector at an end of a spur or branch of the main trunk is shown at 422.

Figure 5:
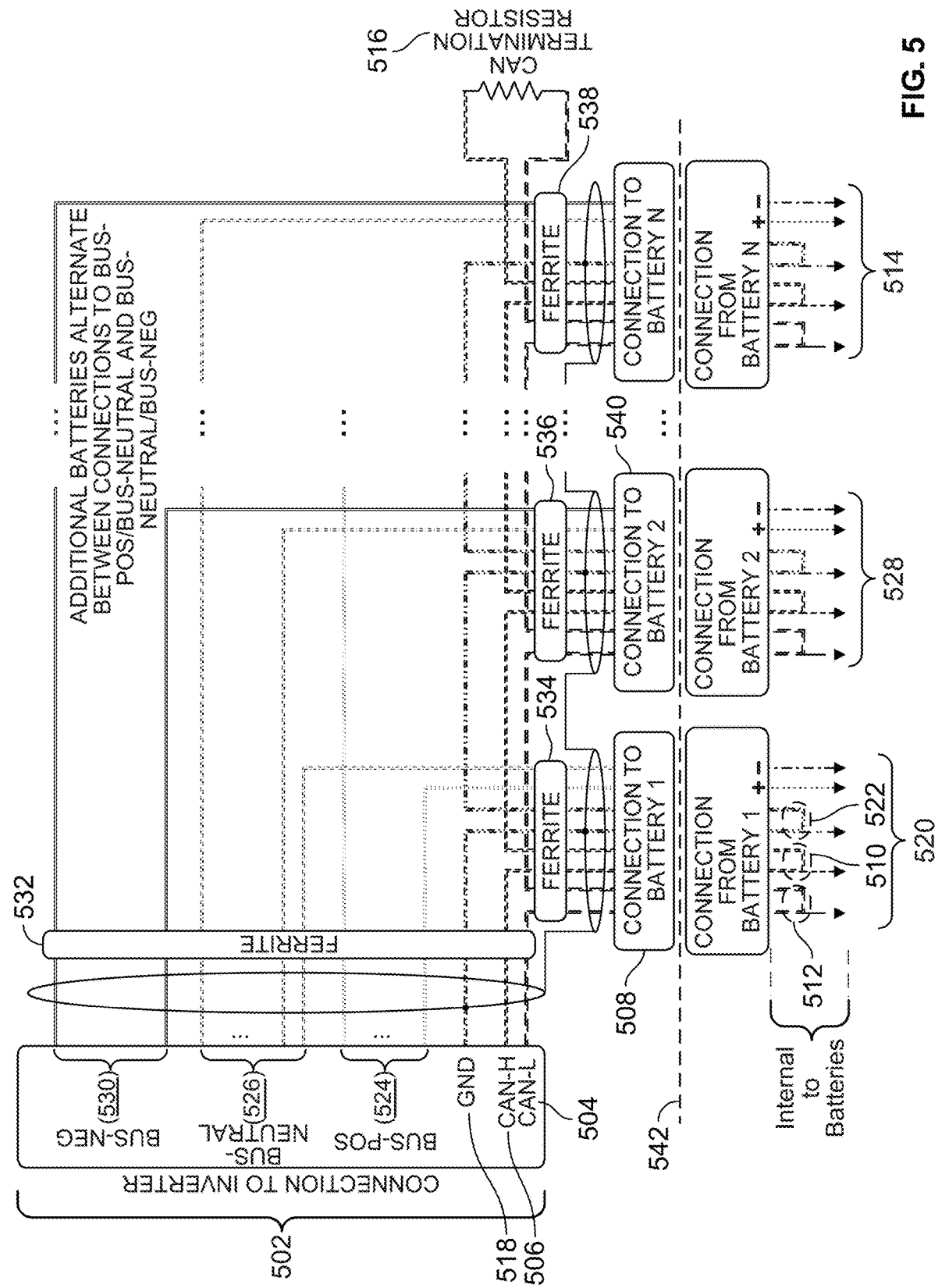
FIG. 5 illustrates an embodiment of a wiring diagram.

FIG. 5 illustrates an embodiment of a wiring diagram. In this example, a wiring diagram in which the inverter and the battery blocks are connected via the wiring harness is shown.

In this example, the trunk harness transfers power, a connection to protective earth, and data between the inverter and all attached battery blocks.

In some embodiments, the inverter and battery blocks use a controller area network (CAN) bus to communicate bidirectionally between devices. In this example, the inverter connector (502) contains two wires for communication: 'CAN high' (CAN H) (504) (CAN-H) (506) and 'CAN low' (506). (CAN-L) (504). In some embodiments, these two wires run in a twisted pair to the first battery block connector (508). In this example, each battery block connector contains four pins for CAN communications: two for 'CAN high' and 'CAN low' from/to the inverter or upstream battery block and two for 'CAN high' and 'CAN low' to the next battery block in the chain. In some embodiments, all pairs of 'CAN high' and 'CAN low' wires are twisted to improve resilience to external noise. As shown in this example, internal to each battery block, the two 'CAN high' pins are electrically connected at 510 and the two 'CAN low' pins are electrically connected at 512, forming a 'daisy chain' connection. This means that once all devices are connected to the trunk harness, signals from the inverter or battery blocks can transmit simultaneously to all devices. The trunk harness can be designed to connect to an arbitrary number of battery blocks. For example, variants of the ESS may have three, four, and six battery blocks (an example with four blocks is described herein for illustrative purposes). For the last battery block (514) on the chain, the trunk harness connects the final two 'CAN high' and 'CAN low' pins together through a CAN termination resistor (516). In one embodiment, per the CAN standard, this resistor is a 120 Ohm resistor.

Similar to the CAN connections, in this example, a single wire on the inverter connector 502 carries protective earth (GND) 518 to the first battery block 520. In this example, each battery block connector contains two pins for protective earth: one for protective earth from the inverter or upstream battery block and one for protective earth to the next battery block in the chain. Internal to the battery block, the two protective earth pins are electrically shorted (as shown at 522), forming a 'daisy chain' connection. This means that once all devices are connected to the trunk harness, protective earth from the inverter is carried to all devices on the trunk harness. In this example, the last battery block (514) on the chain has one unpopulated pin since it has no additional battery blocks to which to connect.

The daisy chaining described above has various benefits. For example, in some cases, there is a limited number of pins on each connector. The daisy chaining through the devices described herein reduces the number of discrete wires that are needed from each of the components, as opposed to having a large wire/conductor and directly pulling off branches from that conductor. Instead, as described herein, daisy chaining is done through each of the battery blocks, back up along the trunk harness. As described above, daisy chaining of the ground connection and CAN connections is performed. In this example, daisy chaining is not performed for the power connections, so that higher current can be achieved. As shown in this example, the power connections are in parallel.

Consider again the example of the ground connection. On the inverter side, there is one pin in the connector that goes to the inverter that carries the ground protective wire. That has one wire which runs to a pin in battery block 1. However, it is desired to be able to carry this ground connection to all of the battery blocks, not only battery block 1. In this example, internal to the DC-DC on the battery block is a jumper. For example, the jumper is a trace on the power board of the DC-DC converter itself that connects the two ground pins on the battery block connector. This means that, electrically, this ground connection is connected through the battery block through one pin, comes out on a second pin, and into the next battery block. This is repeated in series, where the same corresponding two pins on the battery block-side connectors that the ground connection passes through are connected electrically.

This is in contrast to having separate ground wires that all come from the inverter to corresponding battery blocks (e.g., in a three battery block system, having three inverter ground pins, where each inverter-side ground pin connects to a corresponding battery block ground connection, such that one inverter-side ground pin is wired to battery block 1, the second inverter-side ground pin is wired to battery block 2, and the third inverter-side ground pin is wired to battery block 3). While the daisy-chaining reduces the number of inverter-side pins needed for the ground connection in this example, two pins on each of the battery blocks-side are needed for the ground connection (one for ground connection for the battery block, another for passthrough of the ground connection to the next battery block). In some embodiments, which connections are daisy chained is determined based on the limits of the number of pins that are available (and where they are limited, such as at the inverter or the battery block).

For example, suppose that most connectors (that have the appropriate voltage and current ratings) are limited to a maximum pin count of about 16 pins. Because of the number of connections required to the inverter in the ESS, the pins on the inverter connector are more limited than on the battery-block side. In this example case, a tradeoff is made to utilize extra pins on each battery block in order to simplify the connector on the inverter module (e.g., to reduce the number of discrete wires that are needed for the inverter-side connector).

As shown in the example above, similar to the ground connection, the CAN low and CAN high connections are identically jumpered, or daisy-chained, together. For example, CAN low goes in one pin on the battery-block connector, where there is an internal jumper (internal on the battery-side), and then goes out another pin. This is done also for the CAN high connection, which continues to the end of the chain, where, within the wire harness itself, there is a CAN termination resistor 516. The CAN termination resistor connects CAN high to CAN low through, for example, a 120 ohm resistor (which, for example, is a part of the CAN standard to improve signal integrity). The CAN is a bi-directional communication protocol that allows the inverter to communicate with all of the battery blocks, and for all of the battery blocks to communicate with each other as well as to the inverter. By connecting the CAN high and the CAN low through the resistor, the CAN high and CAN low can be at different voltages. For example, the various components communicate amongst each other by pulling the CAN high down to CAN low, or shorting those two together, and using those signals.

In this example, the boundary between the trunk harness and the battery blocks passes through 542, where what is internal to the battery blocks is below 542, and what is a part of the trunk harness is above 542.

The inverter connector 502 also has two pins per battery block for transmitting and receiving power from/to a given battery block. The first battery block 520 on the chain has one pin for the inverter bus positive 524 and one for the inverter bus neutral 526, each of which connects directly to the inverter connector 502. The second battery block 528 on the chain has one pin for the inverter bus neutral 526 and one for the inverter bus negative 530, each of which connects directly to the inverter connector 520. Subsequent odd numbered battery blocks have connections identical to battery block 1 520, and subsequent even numbered battery blocks have connections identical to battery block 2 528 (where the even and odd numbering in the example described herein is for purposes of clarity for explanation, and where the battery blocks need not be numbered, or can be reversed or reordered from the example shown). This means that for configurations with an odd number of battery blocks, the inverter bus positive and bus negative will have an unequal load (e.g., one of the busses will have one more battery block on it than the other bus).

As shown in this example, for battery block 1, its positive terminal goes to inverter bus positive. The negative terminal of battery block 1 is connected to the inverter neutral bus. For battery block 2, the opposite is performed. The positive terminal of battery block 2 is connected to the inverter bus neutral, and the negative terminal is connected to the inverter bus negative. This effectively means that battery blocks 1 and 2 have been connected in series to double the voltage of the battery blocks.

Additional battery blocks are put in parallel with either battery block 1 or with battery block 2. For example, additional odd numbered battery blocks are put in parallel with battery block 1, while additional even numbered battery blocks are put in parallel with battery block 2. In this way, the voltage is doubled, but with opposite polarities so that the inverter sees a bus voltage between the inverter bus positive and the inverter bus negative of, for example, 400V (+200V to −200V relative to the inverter bus neutral).

In some embodiments, to facilitate the opposite polarities, there are different types of spurs for odd battery blocks and even battery blocks. For example, there is one type of spur/connector to connect a battery block's terminals to the bus positive and the bus neutral. There is a second type of spur/connector to connect a battery block's terminals to the bus neutral and the bus negative. For example, consider the spur with the connection 508 to battery block 1. As shown in this example, the last two pins on the far right of the connection to battery 1 (which are power terminals) are connected to the inverter bus positive and the inverter bus neutral. Now consider the spur with the connection 540 to battery block 2. In contrast, as shown in this example, the last two pins on the far right of the connection to battery 2 are connected to the inverter bus neutral and the inverter bus negative. The spurs for the remaining odd blocks have the same wiring/pin mapping as the connection to battery block 1. The spurs for the remaining even blocks have the same wiring/pin mapping as the connection to battery block 2.

Or, put another way, all battery blocks have at least one terminal connected to the inverter bus neutral. For an ESS with an even number of battery blocks, half of the battery blocks have their other terminal (the terminal not connected to neutral) connected to the inverter bus positive, and the other half of the battery blocks have their other terminal (the terminal not connected to neutral) connected to the inverter bus negative.

In some embodiments, in addition to the direct pin to pin connections, the trunk harness has features for electrical shielding and noise rejection. In some embodiments, a braided wire conductive shield encloses all, or a subset of, wires on the trunk harness. In some embodiments, the shield is connected to protective earth at the inverter connector and the protective earth from the upstream battery block at each battery block connector. In some embodiments, all gaps between segments of the braided wire conductive shield are covered with conductive foil, which provides a continuous electrical connection between all parts of the shield and optically covers all wires. In some embodiments, ferrites are installed internally or externally to the shield. In this example, one ferrite 532 is installed adjacent to the inverter connector and one ferrite is installed adjacent to each battery block connector (e.g., ferrites 534, 536, and 538). In some embodiments, ferrites are installed as close to the connector as possible. In some embodiments, all, or a subset of, wires from the inverter connector 502 pass through the inverter ferrite 532 and all wires from each battery block connector pass through the battery block ferrite (e.g., ferrites 534, 536, and 538).

In this example, on the inverter-side connector, there is a dedicated inverter bus neutral pin for each battery block. There is a dedicated inverter bus positive pin for each battery block that is to connect to the bus positive. There is a dedicated inverter bus negative pin for each battery block that is to connect to the bus negative. In this case, the number of battery blocks that may be included in an ESS is in part limited by the number of pins that can be in the inverter-side connector.

As described above, daisy chaining of the bus positive, bus neutral, and bus negative is not necessarily desirable, as this would result in a large amount of current having to go through every one of the battery blocks.

The following is an example of facilitating the expansion of the ESS to include more battery blocks, while utilizing the same number of pins. Suppose that, rather than increasing the power from the inverter, it is desired to increase the energy storage capacity.

Figure 6:
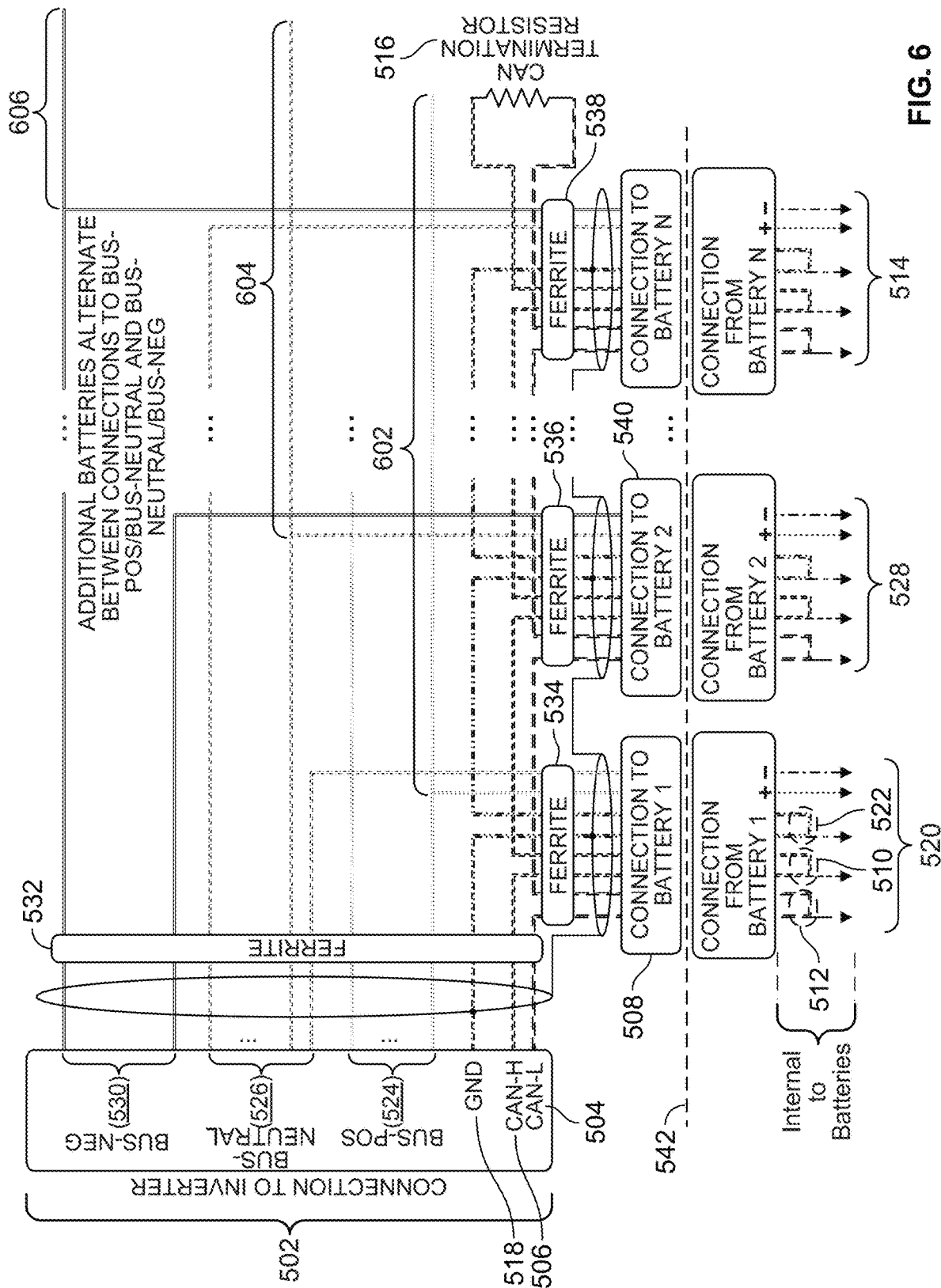
FIG. 6 illustrates an embodiment of a wiring diagram.

As one example, additional battery blocks can be added by splicing additional connections off of each of the existing bus connections/wires/lines. An example of this is shown in FIG. 6, where bus wires are spliced at 602, 604, and 606 to connect to additional battery blocks. If every one of the bus wires of the wiring harness of FIG. 5 is spliced to connect to one additional battery block, then the number of connections is doubled, allowing double the number of batteries. The CAN high, CAN low, and ground connections continue to be daisy-chained, as in the example of FIG. 5. Splicing off of each of the bus positive, neutral, and negative connections allows for the operation of additional battery blocks. In this example case, while the number of battery blocks that can be connected in the ESS can be doubled, the system would not be able to pull more current than each of the wires is rated for. The amount of current would also be limited by the maximum rating of the pins in the connectors, even if smaller gauge wire were used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A wiring harness for an energy storage system, comprising:
   a main trunk;
   an inverter connector configured to plug the main trunk into an inverter module, wherein the inverter connector facilitates connection to:
      a positive DC power bus;
      a negative DC power bus; and
      a neutral power bus;
   a first spur of the main trunk terminating in a first-type energy storage device connector, wherein the first-type energy storage device connector facilitates connection of:
      a positive terminal of a first energy storage device to the positive DC power bus; and
      a negative terminal of the first energy storage device to the neutral power bus; and
   a second spur of the main trunk terminating in a second-type energy storage device connector, wherein the second-type energy storage device connector facilitates connection of:
      a positive terminal of a second energy storage device to the neutral power bus; and
      a negative terminal of the second energy storage device to the negative DC power bus.

2. The wiring harness of claim 1, wherein the inverter module is effectively connected to a plurality of energy storage devices by plugging in the first-type energy storage device connector and the second-type energy storage device connector.

3. The wiring harness of claim 1, wherein the inverter module further comprises an inverter-end ground pin.

4. The wiring harness of claim 3, wherein a ground line connected to the inverter-end ground pin is daisy chained through a plurality of energy storage devices.

5. The wiring harness of claim 4, wherein the daisy chaining is facilitated at least in part by a jumper internal to an energy storage device.

6. The wiring harness of claim 1, wherein the inverter module further comprises an inverter-end set of communications pins.

7. The wiring harness of claim 6, wherein communications lines connected to the inverter-end set of communications pins are daisy chained through a plurality of energy storage devices.

8. The wiring harness of claim 7, wherein the communications lines are terminated by a resistor at an end of the main trunk.

9. The wiring harness of claim 7, wherein the inverter module and the plurality of energy storage devices communicate bidirectionally.

10. The wiring harness of claim 9, wherein the inverter module and the plurality of energy storage devices communicate bidirectionally via a controller area network bus.

* * * * *